(12) United States Patent
Smaidris et al.

(10) Patent No.: US 8,340,929 B2
(45) Date of Patent: Dec. 25, 2012

(54) LIQUID LEVEL DETERMINATION SYSTEM AND ASSOCIATED METHODS

(75) Inventors: Thomas F. Smaidris, Melbourne, FL (US); James Marion Boyd, Indialantic, FL (US); Darrell Lee Manchester, Satellite Beach, FL (US); Gregory Louis Valenti, Melbourne, FL (US)

(73) Assignee: Data Flow Systems, Inc., Melbourne, FL (US)

( * ) Notice: Subject to any disclaimer, the term of this patent is extended or adjusted under 35 U.S.C. 154(b) by 0 days.

(21) Appl. No.: 13/366,712

(22) Filed: Feb. 6, 2012

(65) Prior Publication Data

US 2012/0203478 A1 Aug. 9, 2012

Related U.S. Application Data

(60) Provisional application No. 61/439,430, filed on Feb. 4, 2011.

(51) Int. Cl.
*G01F 23/00* (2006.01)
*G01F 23/14* (2006.01)
*G06F 19/00* (2011.01)

(52) U.S. Cl. .................. 702/55; 405/75; 417/8; 702/47

(58) Field of Classification Search ............ 702/25, 702/51, 55, 98, 100, 123, 124, 138; 73/290 R, 73/302, 439; 405/75; 417/8
See application file for complete search history.

(56) References Cited

U.S. PATENT DOCUMENTS

| | | | |
|---|---|---|---|
| 4,341,504 A * | 7/1982 | Hignutt et al. | 417/8 |
| 4,772,157 A * | 9/1988 | Obermeyer | 405/75 |
| 5,163,324 A | 11/1992 | Stewart | |

* cited by examiner

*Primary Examiner* — John H Le
(74) *Attorney, Agent, or Firm* — Mark R. Malek, Esq.; G. Philip J. Zies, Esq.; Zies Widerman & Malek

(57) ABSTRACT

A liquid level determination system to determine the level of a liquid in a wet we is disclosed. The system may include pressure determination components and a pressure pipe with a pressure sensing pipe end located adjacent to the pressure determination components and a bubbler pipe end locatable at least partially in the wet well. A transducer is used to determine a pressure level within the pressure pipe maintained by a bubbler air compressor. A level detection processor may analyze the pressure level to determine a liquid level in the wet well. An interference dampener is included to mitigate interference originating from the bubbler air compressor. The interference dampener may be provided by transducer plug to restrict air flow. Alternatively, the interference dampener may be provided by a computer operated program to monitor and mitigate the interference.

28 Claims, 11 Drawing Sheets

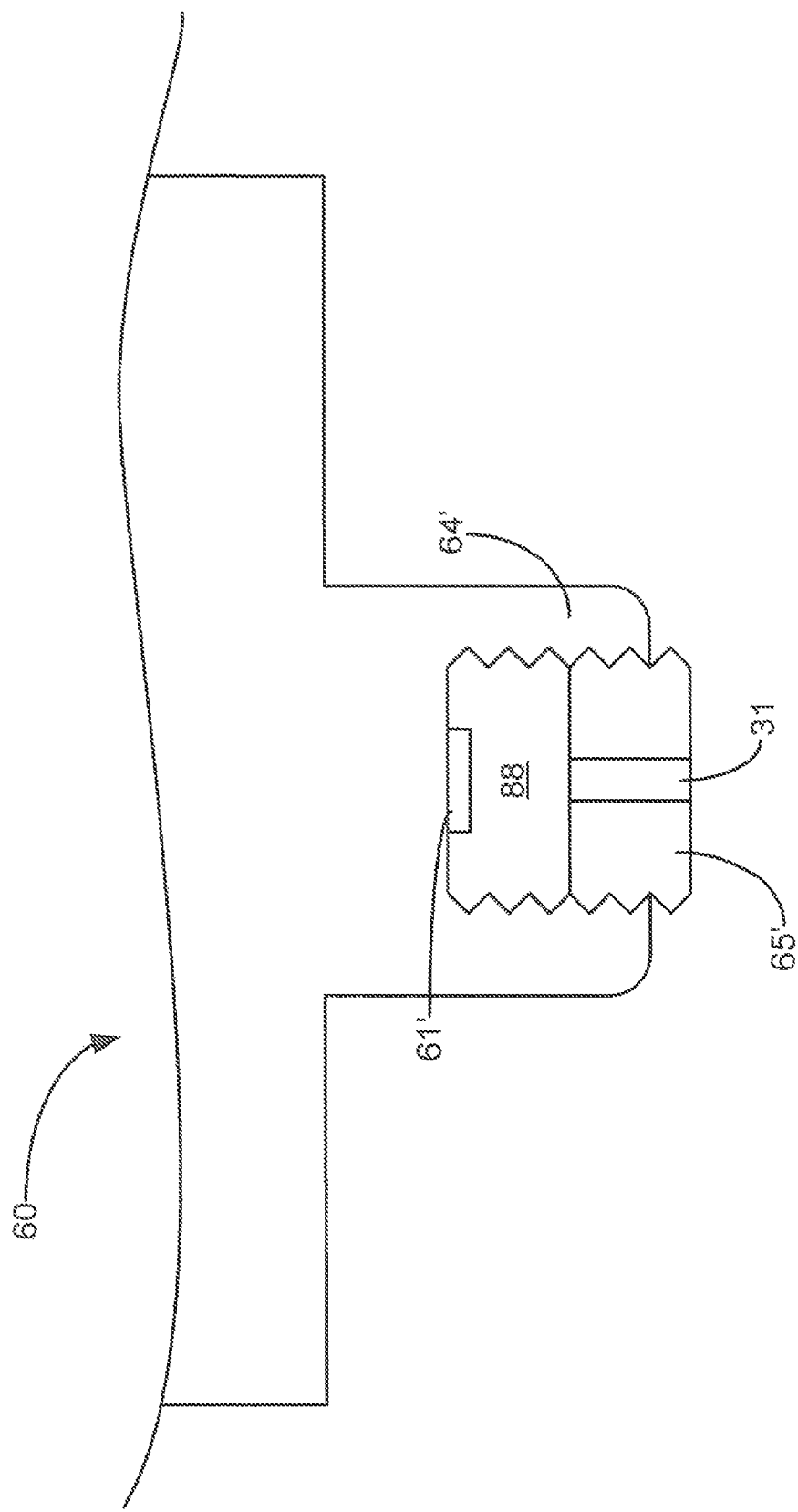

LIQUID LEVEL DETERMINATION SYSTEM AND ASSOCIATED METHODS

RELATED APPLICATIONS

This application is related to and claims the benefit of U.S. Provisional Patent Application Ser. No. 61/439,430 titled REAL TIME BUBBLER WATER LEVEL DETERMINATION SYSTEM WITH TRANSDUCER AND ASSOCIATED METHODS filed on Feb. 4, 2011, the entire contents of which are incorporated herein by reference.

FIELD OF THE INVENTION

This invention relates to the field of pumping systems and, more specifically, to the field of pumping systems that pump liquid out of wet wells using pressure indicating sensors to determine and control the level of liquid therein.

BACKGROUND OF THE INVENTION

Wet wells and liquid holding tanks often require pumping systems to ensure the water levels contained therein do not reach critically high or low levels. In most pumping systems, a pump is required to remove excess water from the wet well. Included in a pump is a volute, or an opening through which the velocity of a fluid is decreased as it is pumped out of the wet well. In most applications, the pump must remain submerged in liquid, as exposure to air will cause excessive vibration during the pumping operation, which may damage the pump. Similarly, exposing the pump to air may cause the pump to overheat.

To ensure the water level in the wet well does not become critically low, water level determination systems are typically used to control the pumping operation. Some water level determination systems use float sensors. These sensors include a float that may make contact with the water surface. The float may be moved from a hanging vertical position to a horizontal position as the float makes contact with the water, initiating the pumping operation.

Although floats are simple in their design, they can become subject to mechanical wear, corrode, or collect deposits from the liquid contained within the wet well, thereby affecting the accuracy of water level determination. Also, as the floats wear or corrode, particles may enter the liquid stored within the wet well or liquid holding tank. The release of these particles may contaminate certain fluids that require a high degree of purity. Furthermore, the presence of corrosion or deposits on the float mechanism may render the float inoperable, thus prohibiting the float from sensing the water level within the wet well.

In an attempt to overcome the deficiencies of floats, those in the art have created water level determination systems that operate by sensing the pressure of the liquid contained within the wet well. Typically, in pressure-based water level sensing systems, a pipe is extended into the wet well. The pipe may have an open end of the pipe submerged below the water level. The opposite end of the pipe typically includes a pressure transducer, which senses the pressure in the tank or wet well. The transducer operates by sensing the pressure level within the attached pipe, and relaying the data to a system that controls the operational state of the pumping system. Generally, the transducer relays sensory information to a switching mechanism, which may change the operational state of the pump when the pressure exceeds certain threshold values.

Despite the reliability improvements provided by the pressure based water level determination systems, the pipe that extends into the wet well may still collect deposits. Such deposits may lead to inaccurately sensing the water level within the wet well, thereby causing an undesired amount of water to be removed. To combat the collection of deposits, those in the art have implemented bubbler systems into the sensing pipes. Bubbler systems typically include an air pump, which injects air into the sensing pipe. Since one end of the sensing pipe is terminated at the transducer, the air is forced to bubble out of the submerged, open end. By bubbling air out of the pressure sensing pipe, the risk of forming deposits on the pipe may be significantly reduced.

Although the bubbler assists in reducing the likelihood of deposits on the open end of the sensing pipe, the bubbler causes vibrations that interfere with the accuracy of the transducer. There is no known structure or apparatus that can apply a bubbler structure to a sensing pipe, yet still maintain the high degree of accuracy achieved in the absence of a bubbler. This, a need exists for water level determination system to accurately determine the water level.

SUMMARY OF THE INVENTION

Such needs are addressed in the present invention. One embodiment of the invention addresses the deficiencies of the prior art by including a sensor plug with a dampening transducer hole drilled therein. The transducer plug may be located at the sensing end of the transducer. The inclusion of the dampening hole reduced the volume of air that may contact the sensory components of the transducer, therefore offsetting the vibration that may be caused during operation of the bubbler which, in turn, enhances the accuracy of pressure sensing by the transducer.

Another embodiment of the present invention implements a computer control program to analyze a signal received by the transducer. In this embodiment, the computer control program electronically compensates for detection of oscillations in the readings received from the pressure transducer that are caused by operation of a bubbler air compressor, and dampens the oscillations reported by the transducer to provide more accurate output values from level detection processor. Additionally, in this embodiment of the invention, the sensing operation advantageously offers real-time monitoring of the operational status of the bubbler air compressor.

Accordingly, the embodiments of the present invention advantageously dampening interference that affects the accuracy of the pressure transducer. The embodiments of the present invention are also advantageously simple to install and maintain. The embodiments of the present invention further advantageously enhance operation of pumps in wet wells, and insures that an improper level determination does not cause a pump in the wet wells to operate in an on position at an inappropriate time.

These and other objects, features and advantages according to embodiments of the present invention are provided by a liquid level determination system that includes pressure determination components and a pressure pipe. The pressure pipe may have a pressure pipe may have a pressure sensing pipe end located adjacent to the pressure determination components and a bubbler pipe end that is locatable at least partially in the wet well. The pressure determination components may comprise a transducer, a level detection processor, a pump controller, a bubbler air compressor, and an interference dampener. The transducer may be used to determine a pressure level within the pressure pipe, and may be located at the pressure pipe sensing end of the pressure pipe.

Additionally, the level detection processor may be included in communication with memory and the transducer.

The level detection processor may analyze the pressure level sensed by the transducer. The pressure level may be transmittable from the transducer to the level detection processor as an electronic signal. The pump controller may be in communication with the level detection processor to control a pump locatable in the wet well.

A bubbler air compressor may be operatively connected to the pressure pipe to provide air pressure to the pressure pipe. Also, an interference dampener may be included to mitigate interference originating, such as from the bubbler air compressor providing the air pressure to the pressure pipe.

According to an embodiment of the present invention, the interference dampener may include a sensor plug positionable on the transducer at a sensing end of the transducer. The sensor plug may at least partially enclose a sensor plug interior space located between a sensing component of the transducer and the sensor plug. The sensor plug may include a transducer hole through which air is passable between the pressure pipe and the sensor plug interior space. The transducer hole may affect a rate at which the air is passable between the pressure pipe and the sensor plug interior space, thereby affecting a pressure level inside the sensor plug interior space. In an embodiment of the present invention, the transducer hole may have a diameter of between about three and seven microns.

According to an embodiment of the present invention, the interference dampener may provided by a computer program product includable in the memory that is executable by the level detection processor. The computer program product may receive the pressure level sensed by the transducer as the electronic signal. The program may then classify the interference included in the electronic signal. Once the interference has been classified, the program may remove at least part of the interference from the electronic signal to produce a dampened transducer signal transmittable to the pump controller. One or more pump may then be controllable by the pump controller using the dampened transducer signal.

The interference dampener may analyze the interference included in the electronic signal to monitor operation of one or more of the pressure determination components. More specifically, the interference dampener may analyze detected oscillating wave patterns in the interference to monitor the operation of the bubbler air compressor.

According to an embodiment of the present invention, calibration of the electronic signal is performable by the level detection processor. The calibration may be storable in the memory. Additionally, rules relating to operation of the level detection processor may be manipulable using an interface. The rules relating to the operation may also be storable in the memory. In another embodiment, at least part of the pressure determination components may be accessible over a network.

According to an embodiment of the present invention, a purge event may be identifiable by the level detection processor. A purge event is defined as removal of an obstruction from the pressure pipe through the bubbler pipe end.

Accordingly, the present invention advantageously provides error correction to offset oscillations caused by a bubbler air compressor in a pressure sensing water level determination system. Other advantages of one or more aspects will be apparent to a skilled artisan after a consideration of the drawings and accompanied descriptions.

BRIEF DESCRIPTION OF THE DRAWINGS

FIG. 7A is a schematic diagram illustrating an enhanced view of the sensing end of the transducer illustrated in FIG. 7.

DETAILED DESCRIPTION OF THE INVENTION

Figure 1:
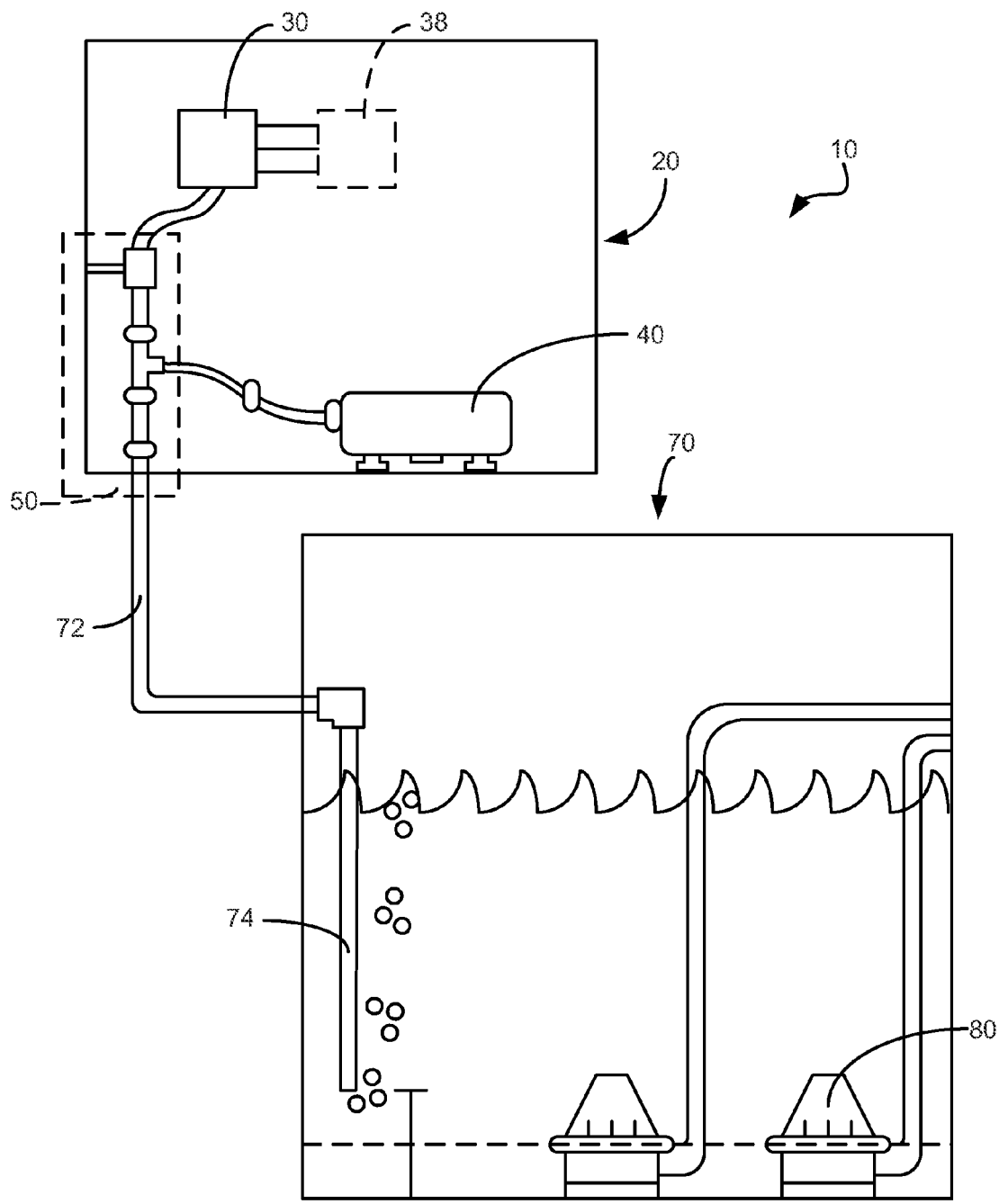
FIG. 1 is a schematic diagram of an illustrative liquid level determination system implementation, according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Embodiments of the present invention are described herein using the context of a system for sensing and accurately removing ter from a wet well. Those of ordinary skill in the art will realize that the following embodiments of the present invention are only illustrative and are not intended to be limiting in any way. Other embodiments of the present invention will readily suggest themselves to such skilled persons having the benefit of this disclosure.

In accordance with embodiments of the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Some aspects of the present invention may include a program that requires the performance of one or more steps on or in association with a computerized device. Examples of a computerized device may include, but should not be limited to, a server, a computer (i.e., desktop computer, laptop computer, netbook, or any machine having a processor), a dumb terminal that provides an interface with a computer or server, a personal digital assistant, mobile communications device, such as a cellular phone, smart phone, or other similar device that provides computer or quasi-computer functionality. Additionally, the program aspects of the present invention may be designed to operate remotely using a computerized device connecting to an external computer, server, or global communications network (such as the Internet), to take direction from or engage in processes which are then delivered to the remotely connected device. It should be noted that the method aspects of the present invention are preferably computer-implemented methods and, more particularly, at least one step is preferably carried out using an integrated circuit or otherwise computerized device.

Embodiments of the present invention include a liquid level determination system 10. Throughout this disclosure, the liquid level determination system 10 may be referred to as a bubbler system, a level determination system, a water level determination system, or simply just a system. Those skilled in the art will appreciate that use of various terms to describe the system 10 in this specification is not meant to be limiting in any way.

FIG. 1 illustrates a liquid level determination system 10 with a transducer 60 in accordance with an embodiment of the present invention. Generally, the system 10 includes pressure determination components 20 and wet well 70 components. The pressure determination components 20 may include a level detection processor 30, a bubbler air compressor 40, and a pressure sensing pipe end 50 of a pressure pipe 72. The pressure sensing components 20 may also optionally include a pump controller 38.

The pressure pipe 72 may extend from the pressure determination components 20 into a wet well. Wet well components 70 may include a bubbler pipe end 74 of the pressure pipe 72 and at least one pump 80.

Figure 2:
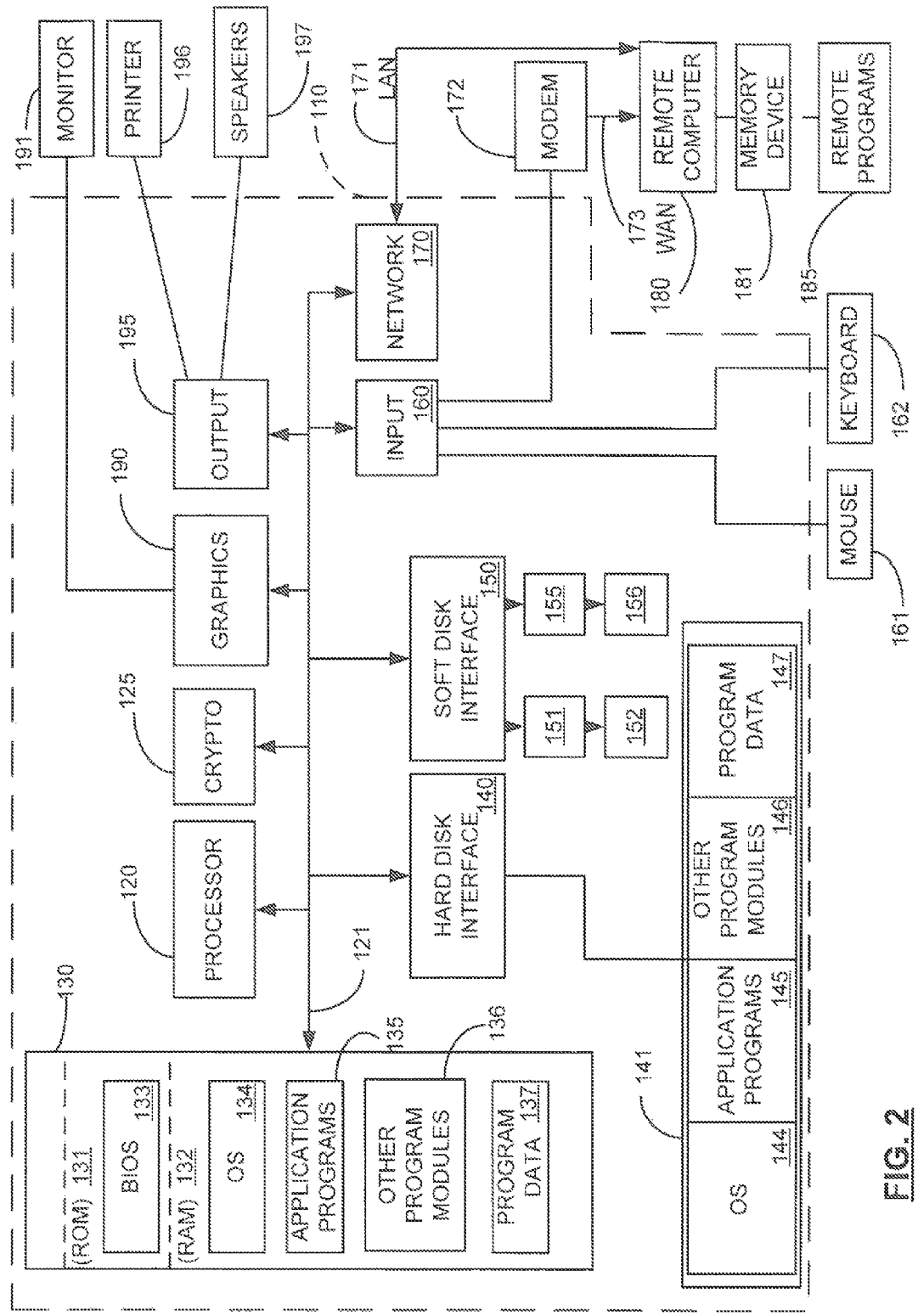
FIG. 2 is a block diagram of a typical computer system that may be used to operate the computer control program of an embodiment of the present invention.

FIG. 2 illustrates a model computing device in the form of a computer 110, which may be used as the level detection processor 30 or pump controller 38, capable of performing one or more computer-implemented steps in practicing the method aspects of the present invention. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In other embodiments, the functions of the cryptographic unit may be instantiated in software and run via the operating system.

A computer 110 typically includes a variety of computer readable media. Computer readable media can be any available media that can be accessed by a computer 110 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates an operating system (OS) 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing an OS 144, application programs 145, other program modules 146, and program data 147. Note that these components can either be the same as or different from OS 134, application programs 135, other program modules 136, and program data 137. The OS 144, application programs 145, other program modifies 146, and program data 147 are given different numbers here to illustrate that, at a minimum, they may be different copies. A user may enter commands and information into the computer 110 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 and 172 allow the device to communicate with other devices. The communications connections 170 and 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

According to an embodiment of the present invention, a computer program product is disclosed, which is capable of analyzing data received from a transducer and electronically compensating for vibrations caused by a bubbler air compressor 40. A level detection system, according to an embodiment of the present invention, will be described in further detail herein. Components of such a system may be operable on dedicated electronic hardware to produce a mitigated single receivable by a pump controller. Such a computer program product would also be suitable for execution on a computer 110 having, for example, but not intended as a limitation, one of Microsoft's Windows family of operating systems, or other operating environment capable of executing electronic commands which may be loaded into memory 134. A person having skill in the art, after having the benefit of this disclosure would recognize that many other development platforms might be used to create a computer program product, which may be executable with many other operating systems, or as code run directly on a hardware device, but that still embody the present invention. As such, the following disclosure is provided merely for explanatory purposes and should in no way limit the present invention to computer program products that are created using the aforementioned development platform or for use with the aforementioned operating systems.

Figure 3:
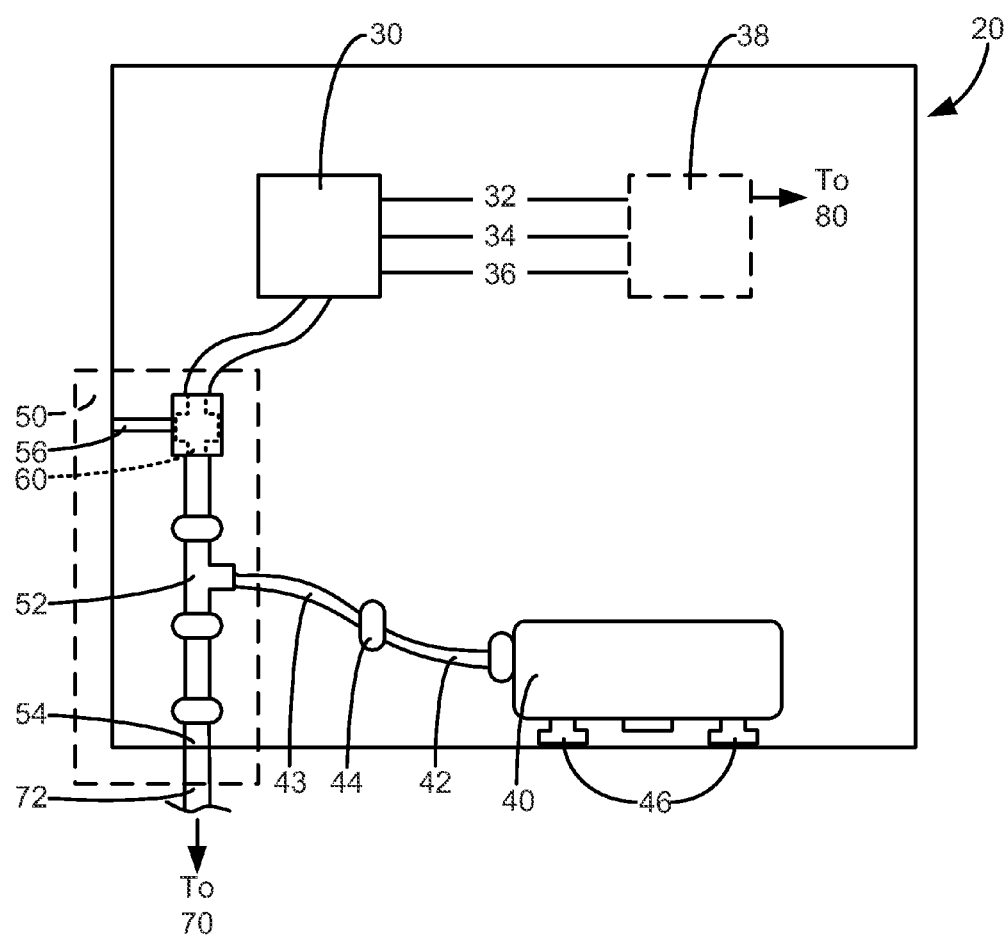
FIG. 3 is a schematic diagram of bubbler control components of the liquid level determination system, according to an embodiment of the present invention.

FIG. 3 illustrates the pressure determination components 20 of the liquid level determination system 10 according to an embodiment of the present invention. The system 10 may include a level detection processor 30 to analyze a signal received by a sensing device, such as a transducer 60. The level signal may be received by detection processor 30 at an input that connects to at least one sensing device, such as a transducer 60, to determine the water level 76 (FIG. 8) in the wet well 70. In embodiments wherein the sensing device is a transducer 60, which may transmit a signal relating to the sensed pressure level inside a pressure pipe 72 to the level detection processor 30. The signal may be electronic, and may carry an analog, digital, or other signal that would be appreciated by skilled artisans.

A person of skill in the art will appreciate that the level detection processor 30, as disclosed herein, may be any form of control device used to monitor and optionally correct (or dampen, as will be discussed in greater detail below) an input signal received from the sensing device, a pressure transducer 60. The level detection processor 30 may output the corrected signal to a connected device, such as a pump controller 38 that is adapted to control the operation of the pumps 80 of the bubbler water level determination system 10.

The signal transmitted by the transducer 60 may indicate a pressure level within the pressure pipe 72. This signal is preferably within the range of 4-20 milliamps, although a skilled artisan will appreciate additional ranges capable of distinguishing the level of pressure within the pressure pipe 72 reportable by the transducer 60. The pressure sensing transducer 60 may be calibrated to read 4 milliamps as a minimum value for failsafe reasons. This failsafe calibration may advantageously allow the level detection processor to interpret a zero milliamp value as a failed sensory reading from the transducer 60. Skilled artisans will appreciate that, although the present embodiment discloses using a pressure transducer 60 as the sensing device, the system 10 may additionally substitute or include a float or other water level 76 determination mechanism known within the art.

The level detection processor 30 may have a plurality of inputs and outputs correlating with the connected sensing devices and pump controllers 38 attached to the level detection processor 30. Accordingly, the level detection processor 30 of the pressure determination components 20 may advantageously be used in connection with any number of devices. Although the level detection processor 30 may be described herein as dampening oscillations from a pressure transducer 60, additional applications will be apparent to those of skill in the art.

As mentioned above, the level detection processor 30 may advantageously be used to dampen oscillations from any electronic source signal. The level detection processor 30 may have an input adapted to receive pressure data, which may have been sensed by the transducer 60. The level detection processor 30 may also include multiple outputs. These outputs may include a dampened transducer signal output 32, a purge event indicator output 34, and a compressor status indicator output 36. These outputs are described as examples of many possible outputs, in the interest of clarity. Skilled artisans should not view the use of these example outputs as limiting in any way. The outputs 32, 34, 36 from the level detection processor 30 may be received by a pump controller 38 or other connected device to monitor and control liquid level in the wet well 72.

The level detection processor 30 may operate a computer control program to analyze the electronic signal received by the transducer 60. The computer program product may include rules in the memory, which may compared to signals or data received by connected devices, such as a transducer 60. The rules may be accessed by the memory during operation of the computer program product. The rules may include conditions and operations affecting analysis of a received signal and mitigation of interference. The rules may be customizable to allow the computer program product adaptability to operate such to be tailored to a particular application in which the system 10 is to be deployed. Alternatively, the rules may be predetermined.

Figure 10:
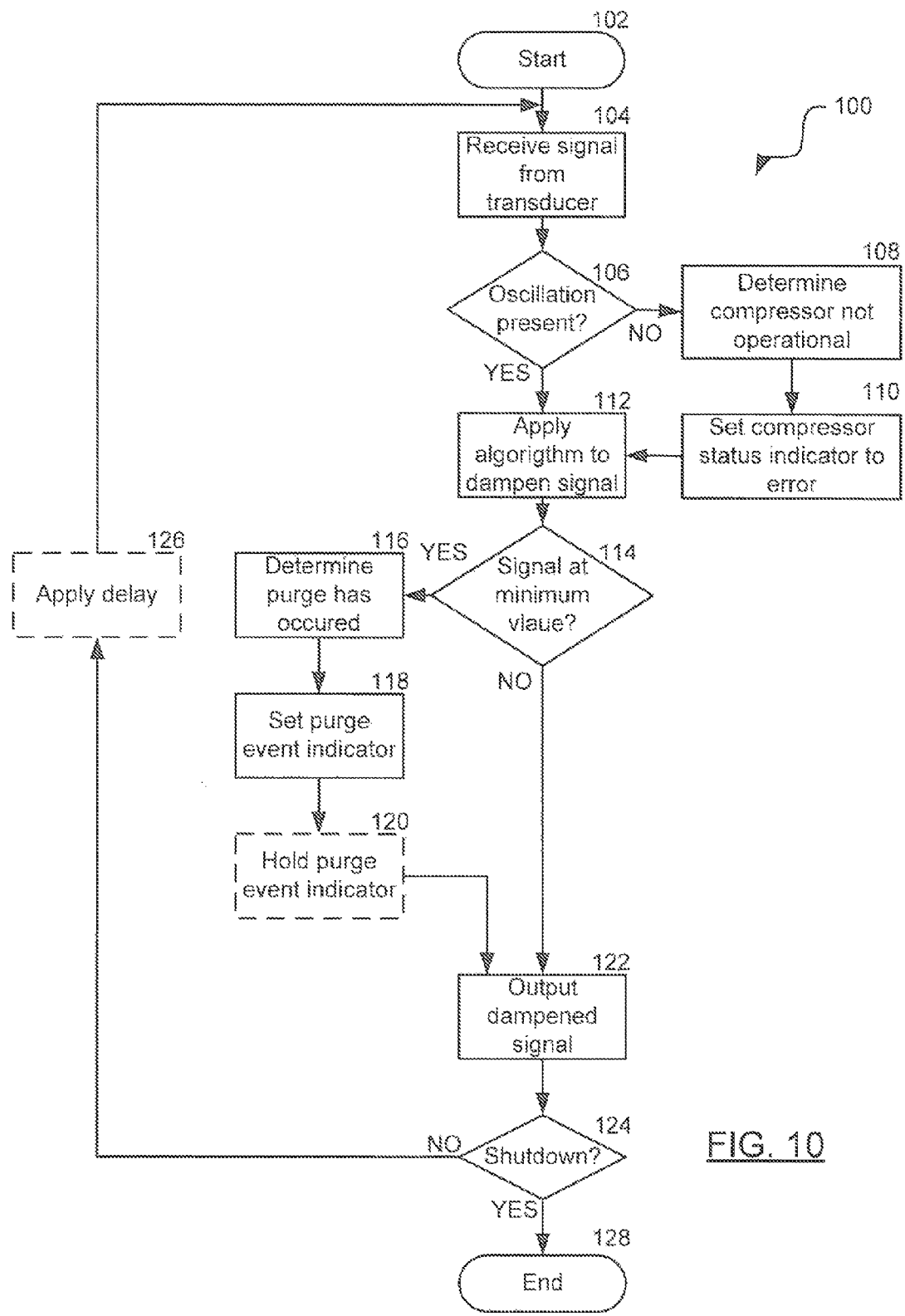
FIG. 10 is a flow chart of an illustrative operation of an interference dampener operated as computer program product of a liquid level determination system according to an embodiment of the present invention.

An example of the computer control program will be described along with flowchart 100 of FIG. 10. The program may analyze an analog electronic signal received by a transducer 60, which may be between the ranges of 4-20 milliamps. The level detection processor 30 may also generate the aforementioned output signals 32, 34, 36 from the analyzed input signal.

As an example, a dampened transducer signal 32 may indicate the pressure level, as sensed by the transducer 60, with the interference caused by the bubbler air compressor 40 substantially removed. These output signals may then be received by a pump controller 38, which may use the output signals to control one or more pump 80.

Additional outputs from the level detection processor 30 may affect the operation of the system 10. These operations may include sensing a water level, sending a signal to the pump controller 38, and controlling the operational states of the pumps 80 to pump water from a wet well 70. The output signals generated by the level detection processor 30 may be connected to a device to provide feedback to an operator or user. Such a device may include, without limitation, a monitor 191, a printer 196, speakers 197, or other device capable of producing an alert.

The pump controller 38 may be connected to the level detection processor 30 to receive a signal, such as a dampened transducer signal 32. The pump controller 38 may also be communicatively connected to a pump 80, to which the pump controller 38 may provide a control signal. FIG. 3 illustrates the pump controller 38 as being a separate component connectable to the output of the level detection processor 30. A skilled artisan will appreciate that the pump controller 38 may also exist as an integrated component of the level detection processor 30.

Additionally, a plurality of pump controllers 38 may optionally be connected to the level detection processor 30 to receive output signals from the level detection processor 30. If present, the plurality of pump controllers 38 may control a plurality of pumps 80 synchronously, independently, or individually.

The pump controller 38 may also determine whether the pump 80 operational state is set to the state or the "off" state. Those skilled in the art will appreciate that any connected device, such as the pump controller 38, may perform any number of functions based on the signals received from the level detection processor 30. To reiterate, the level detection processor 30 should not be limited to outputting three discrete signals (such as signals 32, 34, 36). Conversely, the level detection processor 30 may be adapted to output any number of signals as would be applicable to its operation.

For illustrative purposes, and in the interest of clarity, a non-limiting example of the operation of the pump controller will now be discussed. The pump controller 38 may receive a dampened transducer signal 32 from the level detection processor 30 indicating a low water level 76 in the wet well 70. The pump controller 38 may then set the operational state of one or more pump 80 to the "off" state with a signal transmitted from the pump controller 38 to the pump 80. Upon receiving the signal from the pump controller 38, the pump 80 may be set to the "off" state. If the pump is currently removing water 78 from the wet well 72, the operation may be ceased.

Figure 9:
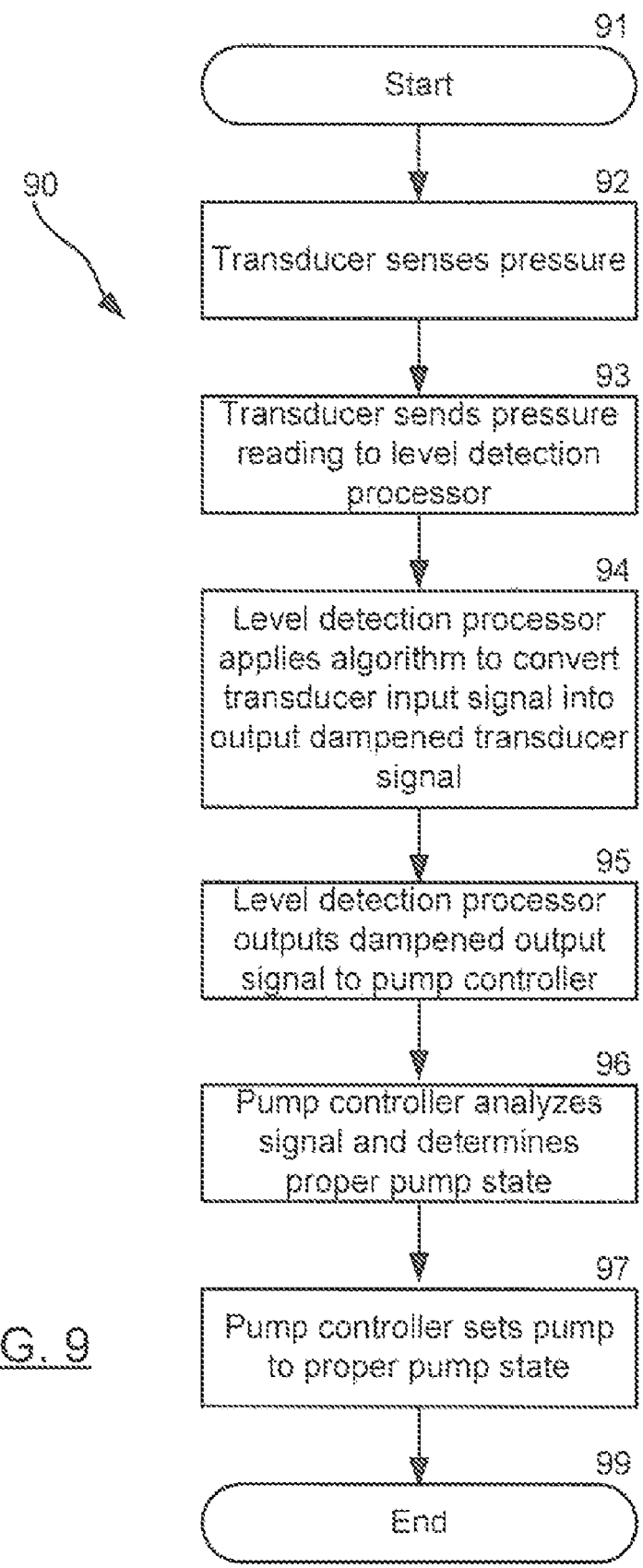
FIG. 9 is a flow chart of an illustrative operation of a liquid level determination system according to an embodiment of the present invention.

A signal may indicate that the water 78 in the wet well 70 is at a customizable or predetermined level, which may be desirable for the pump 80 to be set to the "off" state. Similarly, if the pump controller 38 determines an elevated water level 76 may exist in the wet well 70, the pump controller 38 may set the pump 80 to the "on" state. The pump 80 may then proceed to remove water 78 from the wet well 70. This operation will be discussed in greater detail along with flowchart 90 of FIG. 9.

The level detection processor 30 may also include a purge event indicator 34. As the level detection processor 30 monitors the pressure that accumulates in the pressure pipe 72, purge events may be identified. As an example of an instance that may lead to a purge event, the pressure pipe 72 may become obstructed by a particulate, sediment or other object that may be present in the wet well 70. The transducer 60 may continue sensing the pressure level in the pressure pipe, which may be an elevating pressure reading as the air is unable to escape the pressure pipe 72 through the bubbler opening 77. This could result in the pump 80 remaining in the state, which could cause the pump to continue removing liquid from the wet well 70, thus reducing the water level 76 in the wet well 70.

Purging of the system involves blowing out an obstruction from the pressure pipe 72 that inhibits the normal operation of the system 10. After the water level may fall below the bubbler opening 77 of the pressure pipe 72, the air pressure from the bubbler air compressor 40 may blow out the obstruction. Accordingly, positioning the bubbler opening 77 of the pressure pipe 72 to an elevated distance 81 sufficiently above the intake of the pump may advantageously allow an obstruction that may otherwise produce an inaccurate reading to be blown out of the pressure pipe 72 without increasing the risk of operating a pump 80 that is not properly submerged.

The purging of an obstruction prior to the water level 76 within the wet well 70 being reduced to a point below the intake of the water pump 80 may advantageously reduce the risk of air being sucked into the intake which, may potentially result in an enhanced pump life. Accordingly, once the obstruction has been blown out, the bubbler opening 77 of the pressure pipe will likely be exposed to the atmospheric pressure not submerged in the liquid of the wet well), causing the transducer 60 to report a minimum reading, and more likely, an accurate reading.

The level detection processor 30 may receive the minimum reading from the transducer 60, which may have been preceded by a high pressure reading, the level detection processor may generate an output a purge event indicator signal 34. This purge event indicator signal 34 may indicate that a purge of the pressure pipe 72 has occurred. The purge event indicator signal 34 may be detectable or viewable by a user. The level detection processor 30 may optionally hold this purge event indicator 34 for a sufficient duration to be received by a connected device, such as a pump controller 38 or other connected device.

In another embodiment, a user selectable time interval may be used to determine a duration that the purge event indicator 36 may signify a purge event has occurred. A person of skill in the art will also appreciate that although the embodiments present above discloses automatic purging operations, the present invention may further include a manual purging operation. More specifically, in a manual purging operation, an operator may initiate a purge as described above, regardless of whether an obstruction is detected by the system 10.

Figure 4:
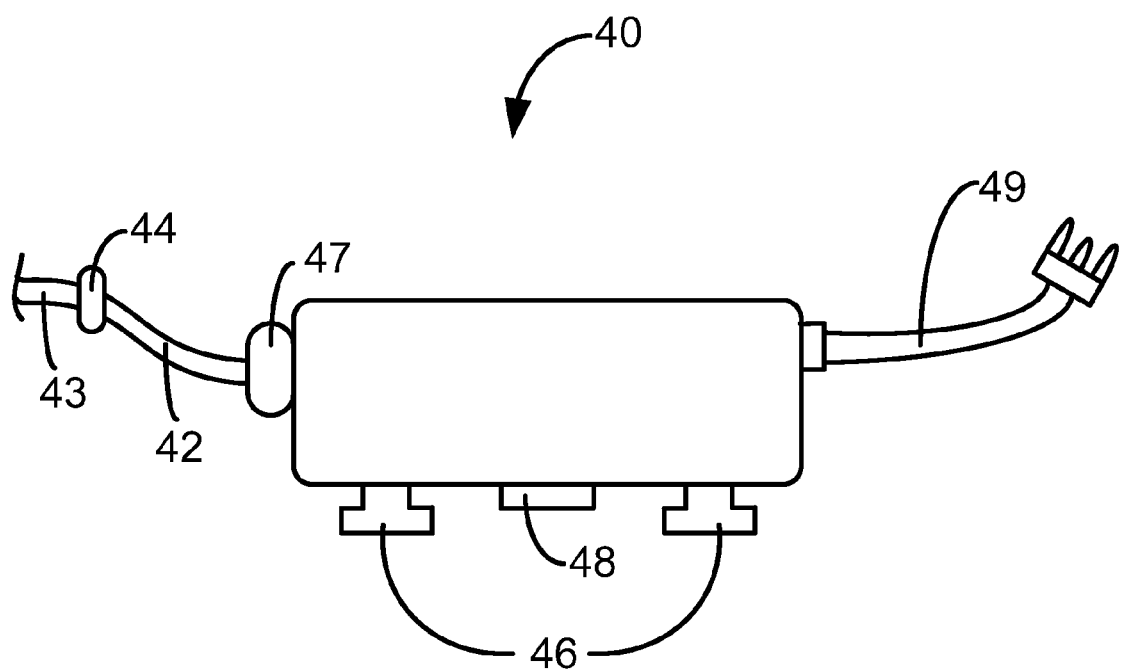
FIG. 4 is a schematic diagram of a bubbler air compressor of the liquid level determination system to an embodiment of the present invention.

FIGS. 3-4 illustrate a bubbler air compressor 40 of the system 10 according to the present invention, as well as other associated elements. In the following example, the bubbler air compressor 40 is discussed as a diaphragm type, oil free, air pump compressor. The bubbler air compressor 40 of this embodiment may output approximately 6.5 PSI, which is equivalent to 15 FT WC. A skilled artisan will appreciate, after having the benefit of this disclosure, that a bubbler air compressor 40 operating with different compression means (i.e. pistons), with different compression ratios, and/or with additional different specifications, should be included within the scope and spirit of the present invention.

The bubbler air compressor 40 illustrated in FIGS. 3-4 may be positioned on a mounting surface via compressor legs 46. The compressor legs 46 may be provided by rigid or flexible materials. In one embodiment, the bubbler air compressor 40 may be supported by rubberized compressor legs 46 to advantageously minimize vibration. To power the bubbler air compressor 40, a compressor power tail 49 may be connected to a power source (not pictured). A skilled artisan will appreciate that a variety of suitable power sources may be used to provide power to a bubbler air compressor 40, such as, but not limited to, a substantially constant voltage or current supply.

Figure 5:
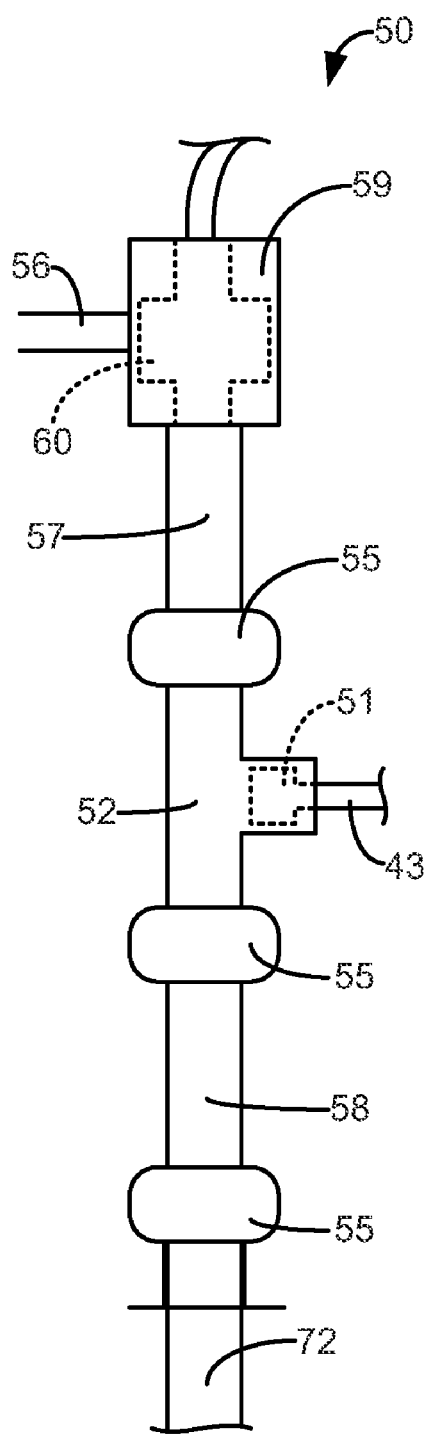
FIG. 5 is a schematic diagram of pressure determination components of a liquid level determination system, according to an embodiment of the present invention.

The bubbler air compressor 40 may intake air through an air inlet 48, for example, located on a bottom portion of the bubbler air compressor 40. Skilled artisans will appreciate that the air inlet 48 is locatable at virtually any location on the bubbler air compressor 40. The air passed through the air inlet 48 may then be pumped through an air outlet 47 into a first air tube 42. In one embodiment, the first air tube 42 may connect to a check valve 44. The check valve 44 may ensure that the air pumped out of the air outlet 47 of the bubbler air compressor 40 only flows in one direction. The air may then be passed through a second air tube 43 to an optional bubbler stone 51 (FIG. 5). Ultimately, the air will be pumped into the pressure sensing pipe end 50 of the pressure pipe 72. A person of skill in the art will appreciate additional devices and techniques of ensuring the proper air flow direction and preventing undesired fluids from flowing into the air outlet 47 of the bubbler air compressor 40. Alternatively, a single air tube may be used instead of a combination of a first air tube 42, second air tube 43, and check valve 44.

FIG. 5, viewed along with FIG. 3, illustrates the components includable in the pressure sensing pipe end 50 of the pressure pipe 72. The pressure sensing pipe end 50 may include a bubbler housing 52, a transducer housing 59, a first pressure pipe end section 57, a second pressure pipe end section 58, pipe couplers 55, and pipe straps 56. Skilled artisans will appreciate embodiments wherein one or more of the aforementioned elements are omitted or substituted in the pressure sensing pipe end 50 of the pressure pipe 72.

The bubbler housing 52 may be included to enclose an air tube received by the bubbler air compressor 40. The bubbler housing may include a bubbler stone 51, which may aerate the air provided to the pressure pipe 72. The bubbler stone 51 may be at least partially enclosed in the bubbler housing 52 to receive the air from the bubbler air compressor 40 via the second air tube 43.

In one embodiment of the present invention, the bubbler housing 52 may be constructed using a "T" pipe fitting that connects to the first pressure pipe end section 57 and the second pressure pipe end section 58, each of which are connectable using the pipe couplers 55. A person of skill in the art will appreciate that the connective structures provided in FIGS. 3, 5 are provided as an example, and that additional connection structures with similar or identical functionality should be considered within the scope and spirit of the present invention.

The first pressure pipe end section 57 may connect the bubbler housing 52 to the transducer housing 59. The first pressure pipe end section 57 may also at least partially enclose the transducer 60. Additionally, the transducer housing 59 may optionally be secured or mounted to a surface via the pipe straps 56. Those skilled in the art will appreciate that the transducer housing 59 may be secured or mounted to a surface using a number of other means as well such as, for example, fasteners, an adhesive, or any other means appropriate to secure the transducer housing to the surface.

The second pressure pipe end section 58 may connect to the pressure pipe 72 near the length that extended to the wet well 70. A person of skill in the art, after having the benefit of this disclosure, will appreciate alternate connective structures to accomplish the same sensing functionality as described herein, which are to be considered within the scope of the present invention.

Figure 6:
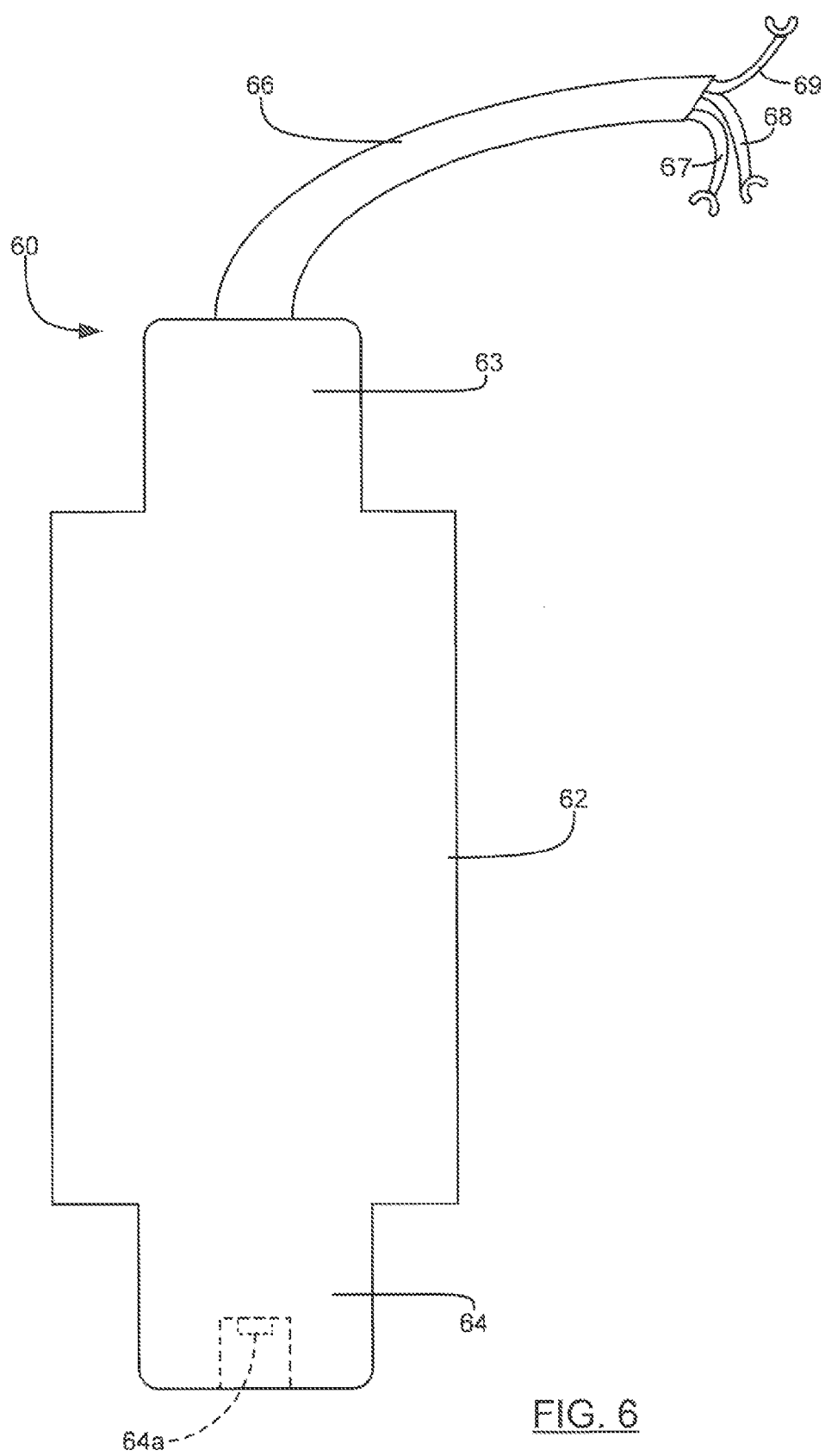
FIG. 6 is a schematic diagram of a transducer used to sense pressure, according to an embodiment of the present invention.
Figure 7:
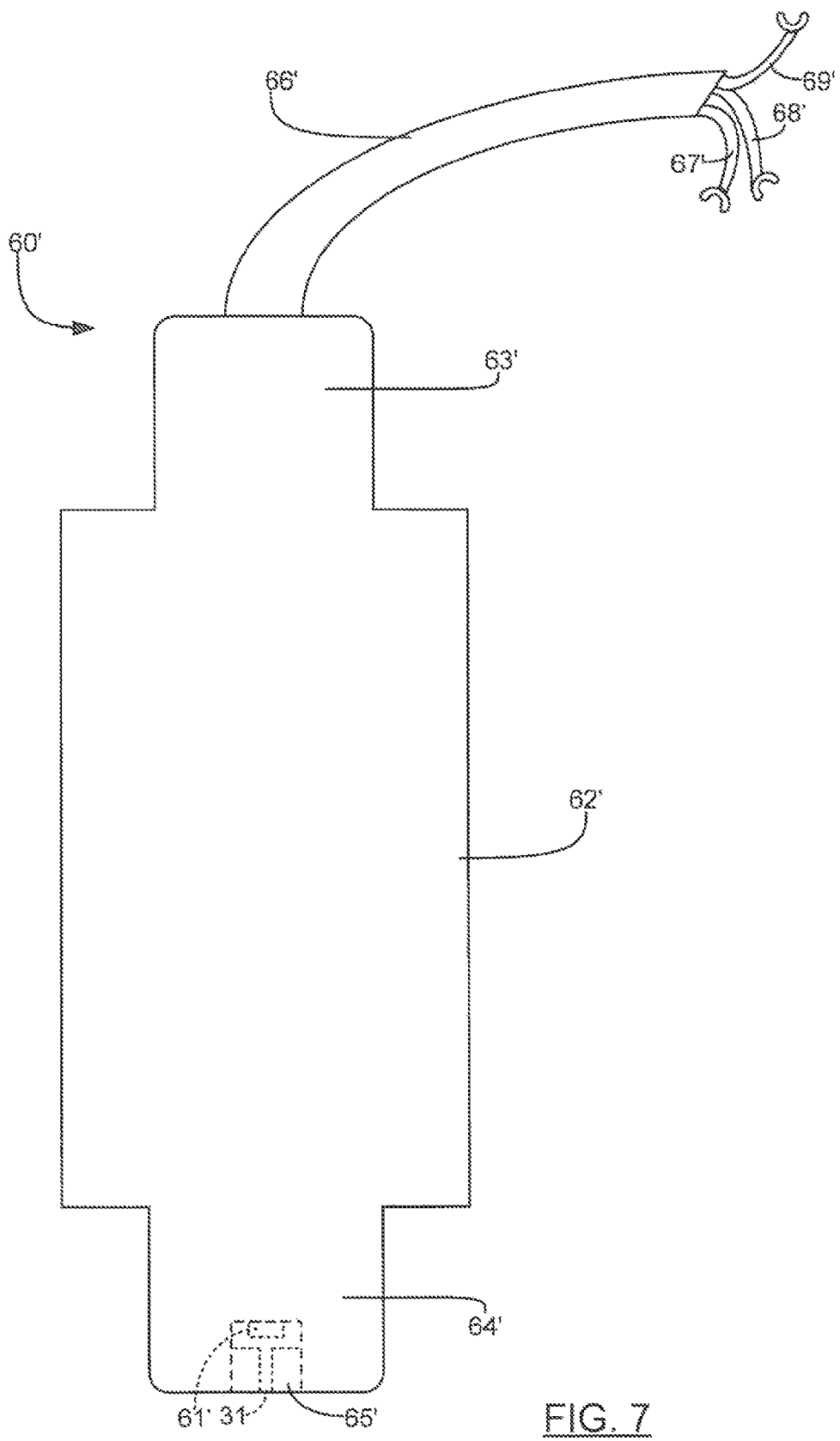
FIG. 7 is a schematic diagram of a transducer of a liquid level determination that is used to sense pressure, and that includes a transducer hole for signal dampening, according to an embodiment of the present invention.

FIGS. 6 and 7 illustrate a transducer 60 includable in the system 10, according to the present invention. The transducer 60 may include a data transducer end 63 and a sensing transducer end 64. The transducer 60, according to the present example, may detect a pressure level at the sensing transducer end 64, sensing pressure via a sensing component 61, such as a pressure sensor, and generating a corresponding data signal transmittable from the data transducer end 63. The transducer body 62 may connect the data transducer end 63 and the sensing transducer end 64, with operational components being includable therein. The data transducer end 63 may include a transducer conduit 66, collectively including power and data connections required for the operation of the transducer 60.

The transducer conduit 66 may include a transducer power lead 67, a transducer ground lead 68, and a transducer data connection 69. However, a person of skill in the art will appreciate that more or less connections may be included in the transducer conduit 66, or otherwise be connected to the transducer 60. The transducer power lead 67 may be connected to a positive voltage. Similarly, the transducer ground lead 68 may be connected to a ground, preferably an earth ground. Collectively, the transducer power lead 67 and ground lead 68 may provide operational power to the transducer 60.

A transducer data connection 69 may be communicatively connected to the level detection processor 30 to transmit a data signal generated during operation of the transducer 60. The data signal may be received by the level detection processor 20 for analysis. A skilled artisan will appreciate additional power and data connections that may be included in the transducer conduit 66, which are included within the scope of the transducer 60 as described in the present invention.

In the following example, as illustrated in FIGS. 7 and 7A, an alternate embodiment of the transducer of FIG. 6 will now be discussed. The elements of the transducer 60' of FIG. 7 will include primed notation to indicate similar feature to the transducer 60 of FIG. 6. If an element included in FIG. 6 is not specifically discussed in the following examples, it will be assumed that no material changes exist from the example of FIG. 6.

As illustrated in FIG. 7, the transducer 60' may include a sensor plug 65', which may be operatively connected to the sensing transducer end 64' of the transducer 60'. The sensor plug 65' may be inserted into the sensing transducer end 64' of the transducer 60', such as via a threaded connection, although a skilled artisan will realize additional connective structures that are intended to be included herein. A sensor plug interior space 88, which may perhaps be best illustrated in FIG. 7A, may be present between the sensor plug and the sensing components 61'. The sensor plug 65' may be used as a form of interference dampener, or a device that mitigates the interference caused during operation. Examples of such interference may include, but should not be limited to, an oscillating wave pattern caused by the operation of a bubbler air compressor 40.

Referring now additionally to FIG. 7A, an enhanced illustration of the pressure sensing end 64' of a transducer 60' will now be presented and discussed. The sensor plug may include a transducer hole 31, which may be drilled into the sensor plug 65'. Preferably, the transducer hole 31 will have a diameter of about five (5) microns, although a skilled artisan will appreciate that the transducer hole 31 may be formed with additional diameter specifications and remain within the scope and spirit of the present invention.

The inclusion of the transducer hole 31 may offset inference in the pressure sensed by the transducer 60', including oscillations generated by the bubbler air compressor 40 during operation of the system 10'. The transducer hole 61' may accomplish this by reducing the volume of airflow exchanged between the pressure sing pipe end 50 of the pressure pipe 72 and the sensing components 61', such as a pressure sensor of the transducer 60'. With a transducer hole 31 being included in the sensor plug 65', the sensing components 61' may detect the pressure of the sensor plug interior space 88 that is at least partially enclosed between the sensing components 61' and the sensor plug 65'. The rate at which the pressure may change in the sensor plug interior space 65' may be controllable respective to the diameter of the transducer hole 31.

Preferably, without limitation, a five micron diameter transducer hole 31 may be located within the sensor plug 65', which may be operatively carried by the sensing transducer end 64' of the transducer 60' via a threaded insert. The threaded insert may, for example, be a hex insert. However, those skilled in the art will appreciate that any other type of insert may be used while still accomplishing the goals, features and objectives according to the present invention.

In the interest of clarity, FIGS. 7-7A illustrate a pressure transducer 60' having a sensor plug 65' with a transducer hole 31 drilled vertically therein. A person of skill in the art will realize, however, that the transducer hole 31 could be included in the sensor plug 65' positioned at various suitable angles that are capable of reducing the volume of airflow between the pressure sensing pipe end 50' and the sensing components 61', thereby offsetting the oscillations caused by the bubbler air pump 40'. A skilled artisan will also realize, after having the benefit of this disclosure, additional widths, shapes, and angles of the transducer hole 31 that provide operation of the system 10' as described herein. Those skilled in the art will appreciate that the angle of the transducer hole 31 may be, for example, but not limited to, vertical, diagonal, curved, catawampus, arcuate, straight, or other directions, and any combination thereof. Furthermore, a skilled artisan will realize that, in addition to the aforementioned drilling technique, the transducer hole 31 may be formed by an alternative hole creation technique known in the art.

Figure 8:
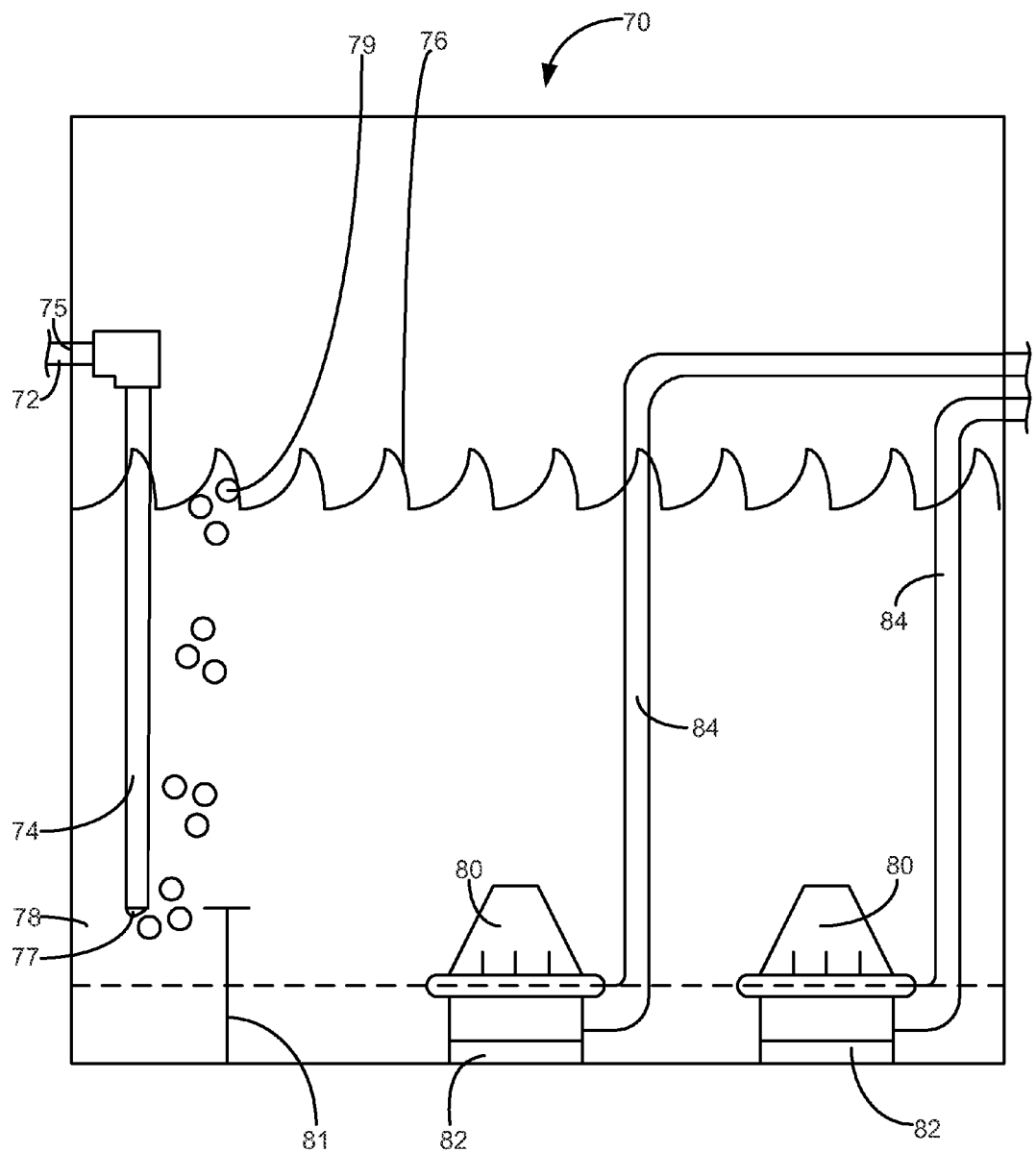
FIG. 8 is a schematic diagram illustrating a wet well wherein portions of a liquid level determination system according to an embodiment of the present invention are installed.

FIG. 8 illustrates components includable in a wet well 70. More specifically, the components of the wet well 70 include the bubbler pipe end 74 of the pressure pipe 72 and pump output pipes 84. Wet wells 70 are generally known within the art, being defined as a chamber used for collecting liquid, in which a pump 80 removes the liquid collected therein via the pump output pipes 84. More particularly, wet wells 70 are generally used in connection with force mains of waste water collection systems to collect waste water that is being transported from the field, i.e., from an origination point, to a waste water treatment plant. Wet wells are generally used in geographical locations that are somewhat flat, and do not have significant elevation changes to suit gravity fed flow. Wet wells are also used, however, in geographical locations that do have elevation changes to lift the contents of the wet well to a suitable elevation so that gravity can be used to move the contents to the treatment facility. However, a person of skill in the art will appreciate that any space capable of collecting and holding water may be used in substitution and/or supplementation of a wet well 70. As water 78, or other liquids, flow into the wet well 70, the water level 76 begins to rise. To ensure a satisfactory water level 76 is maintained in the wet well 70, a pump 80 is often required to remove an amount of water 78 from the wet well.

To determine the water level 76 within a wet well 70, the pressure pipe 72 may be directed into the wet well 70 through an entry point 75. A person of skill in the art will realize that the entry point 75 may allow the pressure pipe 72 to enter the wet well 70 through various locations, such as, for example, the side of the wet well 70, an opened or at least partially enclosed top of the wet well 70, or through another entry point 75 that would provide access to an interior portion of the wet well.

As previously mentioned, in the preferred embodiment of the system 10 according to the present invention, the pressure pipe 72 has at least two ends. A first end is a pressure sensing pipe end 50 and the other end is a bubbler pipe end 74 which may be located opposite the pressure sensing pipe end along the length of the pressure pipe 72. A skilled artisan will appreciate that additional ends may be included in the pressure pipe 72, and should not limit the pressure pipe 72 to only including two ends. The bubbler pipe end 74 of the pressure pipe 72 enters into the wet well 70, wherein the pressure pipe 72 extends into the wet well 70 approximately to an elevated distance 81 above the floor surface of the wet well 70. At the elevated distance 81, the pressure pipe 72 may terminate at the bubbler pipe end 74 with a bubbler opening 77, or an opened pipe end, which may allow the escape of the bubbles 79 created during operation of the system 10.

In the preferred embodiment, the elevated distance 81 is one foot, but a person of skill in the art will realize that varying distances that may be used, configurable to a particular application and pump configuration. At the bubbler pipe end 74, the pressure pipe 72 features a bubbler opening 77, which may be used to release the air pressure pumped into the pressure pipe 72 by the bubbler air compressor 40. As the air exits the bubbler pipe end 74 of the pressure pipe 72 through the bubbler opening 77, the air may surface through the water 78 as bubbles 79. Preferably, the bubbler opening 77 is an unobstructed opening, but a person of skill in the art will realize that the use of a screen, mesh, netting, or other covering means may be implemented in additional embodiments of the bubbler opening 77. Such covering means advantageously may prevent sediment or other particles from obstructing the bubbler opening 77, and allows for ready cleaning of the bubbler opening as necessary. A skilled artisan will also realize that the use of multiple bubbler openings 77, multiple bubbler pipe ends 74, or multiple pressure pipes 72 are to be included within the scope and spirit of the present invention.

At least one pump 80 may be submerged under the water 78, which may operate to remove the excess water 78 from the wet well 70. Those skilled in the art will appreciate that the present invention is not meant to be limited to the removal of water 78 from the wet well, but is also intended to include any fluid that may be contained in the wet well such as, for example, waste water or reuse water. In an embodiment of the present invention, a centrifugal pump may be used to remove the excess water 78. With centrifugal pumps, fluid may be drawn in through an inlet submerged in a fluid, such as water 78. Once the water 78 has entered the pump 80, the pump may accelerate the fluid outward towards an outlet. The pump may then further direct the water 78 through the pump output pipes 84. The pump outlet is a casing of the pump 80 with a curved funnel, wherein the curved funnel has an increasing diameter as the distance from the inlet port increases and the distance from the output port decreases. The pump outlet acts to slow down the flow of water 78 as it exits the pump 80. A skilled artisan will realize that any suitable pumping means may be employed to remove water 78 from the wet well 70 as described in this disclosure.

In an additional embodiment, and as described above, the system 10 of the present invention may be included in a liquid containment structure other than a wet well to hold a liquid such as, for example, fluid storage tanks used in connection with water treatment plants and waste water treatment plants, or any other structure that is used to treat fluids and that may incorporate structures to hold such fluids. Those skilled in the art will further appreciate that the system 10 according to embodiments of the present invention may be utilized at any stage of a treatment process or manufacturing process of any fluid. The liquid containment structure may optionally omit a pump, whereby it may remove the liquid passively, such as by using gravity. An example of such a liquid containment structure may include a water tower.

The following embodiments of the present invention are illustrative, and are not intended to be limiting. A person of skill in the art will appreciate additional operational variations that, while being variations of the following example, will still enable performance of the system 10, as disclosed herein, and are meant to be included within the scope and spirit of the present invention.

In operation, the system 10 of the present invention may determine the water level 76 in a wet well 70. More specifically the system 10 may determine the water level 76 in a wet well 70 by using a pressure transducer 60, which may sense the pressure (i.e., head pressure which is an indication of water level within the wet well) within a pressure pipe 72, and which pressure pipe 72 is submerged within the water 78 held in the wet well 70.

Air may continually escape through the bubbler pipe end 74 of the pressure pipe 72, submerged into the water 78 within the wet well 70, as bubbles 79. A pressure transducer 60 located at the pressure sensing pipe end 50 of the pressure pipe 72 may be used to measure air pressure required to force air through the pressure pipe 72. This air pressure may be generated by the bubbler air compressor 40, which may compress air from the air inlet 48 though the first air tube 42 and second air tube 43 to enter the pressure pipe 72 via the bubbler housing 52. When the air contained within the pressure pipe 72 reaches a sufficient pressure, bubbles 79 will escape from the bubbler opening 77 of pressure pipe 72.

As the water level 76 raises in the wet well 70, so does the volume of water 78 that has been collected in the wet well 70. Additionally, as the volume of water 78 in the wet well 70 increases, so does its weight. The increasing weight of the water 78 creates a water pressure at the bubbler opening 77 of the pressure pipe 72, requiring an increased air pressure threshold for the system 10 to emit bubbles 79 out of the bubbler opening 77 of the pressure pipe 72. The transducer 60 may sense this air pressure required to overcome the water pressure emit bubbles from the pressure pipe 72, converting the air pressure reading into an electronic data signal. Preferably provided as an analog electronic data signal, the electronic data signal may be read by the level detection processor 30 and, subsequently, the pump controller 38.

The data signal may be received by the level detection processor 30 via the transducer data connection 69 of the transducer 60. As a result, the water level 76 within the wet well 70 may be calculated by the pump controller 38 after analyzing a variety of factors, including pressure values measured by the transducer 60 and corrected by the level detection processor 30. The level detection processor 30 may transmit output signals to the pump controller 38, which may include a dampened transducer signal 32 with interference mitigated. Upon receiving the dampened transducer signal 32, the pump controller 38 may then determine the water level 76 within the wet well 70. The pump controller 38 may then select the appropriate operational state of one or more pump 80, such as an "on" and "off" state.

In one embodiment of the present invention, the pressure transducer 60 may sense and transmit pressure status readings to the level detection processor 30 at approximately continuous intervals. In this embodiment, the transducer 60 may continuously sense the pressure levels within the pressure pipe 72 and transmits the corresponding electronic signal to the level detection processor 30.

In another embodiment of the present invention, the pressure transducer 60 my sense and transmit pressure status readings at customizable and/or predetermined intervals, or status points. Each status point may include one cycle of the steps including sensing the pressure levels within the pressure pipe 72 and transmitting the corresponding electronic signal representing the pressure values to the level detection processor 30. In this embodiment, status points may be repeatedly generated at the intervals.

The air pressure in the pressure pipe 72 may be continually maintained by the bubbler air compressor 40. However, continual operation of the bubbler air compressor 40 may introduce pressure oscillations into the system 10, which may cause the transducer 60 to report inaccurate readings. As the bubbler air compressor 40 creates air pressure that is introduced into the pressure pipe 72, the bubbler air compressor 40 may also create a sinusoidal oscillation relative to its operating frequency. A person of skill in the art will appreciate additional interfering frequencies that my cause inaccurate readings by the transducer 60, such as, but not limited to, triangle waves, sawtooth waves, square waves, or other electronic noise. This sinusoidal oscillation may cause interference with the signal received by the sensing components of the pressure transducer 60, thus negatively affecting the accuracy of the pressure reported by the transducer 60 to the level detection processor 30 during operation. One such inaccuracy could include the transducer 60 erroneously reporting that the water level is fluctuating with the curve of the interfering sinusoidal wave. This erroneous report may damage the pumps 80 by causing the pumps to constantly switch between the "on" and "off" states.

Operation of the pressure transducer 60' illustrated in FIGS. 7-7A is now described in greater detail. As illustrated, a transducer hole 31 may be drilled in the sensor plug 65', which may be inserted into the sensing transducer end 64' of the transducer 60'. The presence of the transducer hole 31 may offset the oscillating vibrations created by the bubbler air compressor 40' during operation of the system 10 by reducing the volume of airflow between the sensing components 61' and the pressure sensing pipe end 50'. Since the volume of air that may flow through the transducer hole 31 is reduced, the oscillations in air pressure created by operation of the bubbler air compressor 40' may be restricted to the larger volume of the pressure sensing pipe end 50' of the pressure pipe 72', and not the volume of air in the sensor plug interior space 88 close to the sensing components 61' of the transducer 60'.

However, in some instances, the inclusion of a transducer hole 61' may remove the oscillations entirely, before such oscillations may be sensed by the transducer 60. Without the ability of the transducer 60 to sense these oscillations, the level detection processor 30 may not be able to determine whether the bubbler air compressor 40 is operating properly.

In an additional embodiment, the interference created during the operation of the system 10 may be mitigated via a program 100 executed on the level detection processor 30. With the inclusion of the program 100, as illustrated as flowchart 90 of FIG. 9, starting at Block 91, the transducer 60 may sense the interference, such as oscillations created by the bubbler air compressor 40, in addition to the pressure readings of the pressure in the pressure pipe 72, during operation of the system 10 (Block 92). The air pressure sensed by the transducer 60, along with the oscillation created by the bubbler air compressor 40, may be transmitted to the level detection processor 30 as part of the electronic signal (Block 93).

Once received by the level detection processor 30, a program may be used to dampen or correct the electronic signal generated by the transducer 60 (Block 94). The dampened transducer signal 32 may then be outputted from the level detection processor 30 to the pump controller 38 (Block 95). After receiving the dampened transducer signal 32 from the level detection processor 30, the pump controller 38 may accurately determine the water level 76 in the wet well 70 and then determine the proper pump state for the pumps 80 (Block 96). The pump controller may then control the pumps 80 by setting the pumps 80 to the proper pump state accordingly, completing the pressure sensing and dampening process of the current embodiment of the present invention (Block 97). The operation may then terminate at Block 99.

The level detection processor 30, according to embodiments of the present invention may also be capable of determining the operation status of the bubbler air compressor 40 and whether a purge event has occurred. The program 100 may also include algorithms used for the isolation and removal of the sinusoidal oscillation created by the bubbler air compressor 40 during operation of the system 10.

Referring now to flowchart 100 of FIG. 10, a program performable on the level detection processor 30 will now be discussed. The program may output electronic signals to a connected device, such as a pump controller 38, which may control the operational states of the pumps 80.

Starting at Block 102, the program 100 may receive an electronic signal from the pressure transducer 60 (Block 104), typically including a sensed pressure reading. The sensed pressure reading may be generated by the pressure created by the water 78 in the wet well 70. The pressure transducer may also detect interference, such as with an oscillation reading generated by the operation of the bubbler air compressor 40.

Next, the program 100 may analyze the electronic signal received by the transducer 60 to determine if an oscillation is present (Block 106). If no oscillation is detected, the program may determine that the bubbler air compressor 40 is not operational (Block 108). The program 100 may then generate an error on the compressor status indicator 36 output (Block 110). The program 100 may then progresses to the operation of Block 112. A person of skill in the art will realize that an error signal can be generated, for example, as an electronic signal line held high, held low, or transmitted as another electronic signal used to indicate an error has occurred. A skilled artisan will additionally realize that the error signal may be accompanied by, or be substituted with, a mechanical or audio-visual alert system that will also accomplish the functionality and goals describe within this disclosure. Additionally, an error signal may cause the level determination processor 20 and/or the pump controller 38 to halt operation of the pumps 80 included in the wet well 70.

If an oscillation is detected at the operation of Block 106, or after the completion of the steps indicated in Blocks 108 and 110, the program 100 may apply an algorithm to the electronic signal received by the transducer 60 in Block 104 to dampen the oscillation (Block 112). The dampening of the interfering oscillation may produce a clean, dampened transducer signal 32. Any algorithm may be used that is capable of removing oscillations from a signal, many of which will be known and appreciated by those in the art.

After creating the dampened transducer signal 32, the program 100 may determine if the signal is substantially dose to the minimum value that may be generated by the transducer 60 (Block 114). In the present example, the transducer 60 may be capable of outputting an electronic signal that ranges between 4-20 milliamps. Continuing with this example, the minimum value would be 4 milliamps.

If the program 100 determines that the dampened output signal 32 is substantially close to the minimum value, the program may determine that a purge event has occurred (Block 116). Upon this determination, the program may set the purge event indicator 34 to transmit an electronic signal that may be received by a connected device, such as a pump controller 38 or interlace (Block 118). Optionally, a step may be included to hold the purge event indicator 34 at the alerting value for a customizable and/or predetermined duration (Block 120). Preferably, if the purge event indicator 34 is held for a duration, that duration would be long enough that a connected device, such as the pump controller 38, would have adequate time to receive and process the purge event indicator 34. A skilled artisan will appreciate, after having the benefit of this disclosure, the hold duration of the purge event indicator 34 may be set to any configurable duration.

If the dampened transducer signal 32 is not substantially close to the minimum value, or after the completion of the steps indicated in Blocks 116, 118 and optionally 120, the program 100 may output the dampened transducer signal 32 (Block 122). The output dampened transducer signal 32, along with the purge event indicator 34 and the compressor status indicator 36, may be received by a connected device, such as a pump controller 38, for further processing.

The program may then determine whether a shutdown command has been issued at Block 124. If no shutdown command has been issued, the program 100 may return to Block 104, wherein it will again receive a signal from the transducer 60.

Optionally, the program may include a delay operation (Block 126). Since it may not be necessary to analyze the reading created by the transducer 60 continuously, the program may be configured to take a reading periodically. As an example, the program 100 may complete one cycle of converting an electronic signal with an interfering oscillation, holding the resulting value on dampened transducer signal output 32 once every ten (10) minutes. After the delay has expired, the program 100 will return to Block 104 and complete another cycle of operation, again pausing at the Block 126 delay. Inclusion of the delay may allow the system 10 to operate at increased efficiency. If a shutdown command has been issued, the program will terminate (Block 128).

The system 10 of the present invention offers many additional advantages over the prior art. Since the signal generated by the transducer 60 is analyzed by a level detecting processor 30, calibration of the transducer 60 may be handled within the level detection processor. By calibrating the transducer within the level detecting processor, a consumer may equip his or her system with a more cost effective transducer 60 without calibration features included. Also, an auxiliary interface may be included such to allow communication with the level detecting processor 30 and/or pump controller 38 from a remote location. Such remote connections may be made via a computer, such as the computer illustrated by FIG. 2, a mobile phone, or other portable computing device. Since the system 10 can sense the operational characteristics of its various components (i.e., compressor 40 oscillations, transducer 60 minimum output value), the system 10 of the present invention may provide feedback regarding the operational status of the connected components.

A person of skill in the art will realize that the aforementioned embodiment of a program 100, used in the sensing and correcting of the data signal received by a transducer 60 including pressure sensing data and oscillations, is not to be interpreted as limiting. Although the above program discloses one embodiment of the program 100 used by the level detection processor 30 of the system 10, a skilled artisan, after having the benefit of this disclosure, will realize a plethora of variations that will be included within the scope and spirit of the present invention.

Also, generally, many modifications and other embodiments of the present invention will come to the mind of one skilled in the art having the benefit of the teachings presented in the foregoing descriptions and the associated drawings. Therefore, it is understood that the invention is not to be limited to the specific embodiments disclosed herein.

What is claimed is:

1. A liquid level determination system comprising:
pressure determination components; and
a pressure pipe with a pressure sensing pipe end located adjacent to the pressure determination components and a bubbler pipe end locatable at least partially in a wet well, wherein the wet well is defined as a space in which liquid is collectable;
wherein the pressure determination components comprise:
a transducer carried by the pressure pipe adjacent to the pressure pipe sensing end for determining a pressure level within the pressure pipe,
a level detection processor in communication with memory and the transducer to analyze the pressure level sensed by the transducer,
a pump controller in communication with the level detection processor to control a pump locatable in the wet well;
a bubbler air compressor operatively connected to the pressure pipe to provide air pressure to the pressure pipe, and
an interference dampener to mitigate interference originating from the bubbler air compressor providing the air pressure to the pressure pipe.

2. The liquid level determination system according to claim 1 wherein the interference dampener includes a sensor plug positionable on the transducer at a sensing end of the transducer, the sensor plug at least partially enclosing a sensor plug interior space located between a sensing component of the transducer and the sensor plug, the sensor plug including a transducer hole through which air is passable between the pressure pipe and the sensor plug interior space, and the transducer hole affecting a rate at which the air is passable between the pressure pipe and the sensor plug interior space.

3. The liquid determination system according to claim 2 wherein the transducer hole has a diameter of between about three and seven microns.

4. The liquid level determination system according to claim 1 wherein the interference dampener is provided by a computer program product includable in the memory that is executable by the level detection processor, the program carrying out the following steps:
receiving the pressure level sensed by the transducer as an electronic signal;
classifying interference included in the electronic signal; and
removing at least part of the interference from the electronic signal to produce a dampened transducer signal transmittable to the pump controller;
wherein the pump is controllable by the pump controller based on the dampened transducer signal.

5. The liquid level determination system according to claim 4 wherein the interference dampener analyzes the interference included in the electronic signal to monitor operation of at least one of the pressure determination components.

6. The liquid level determination system according to claim 4 wherein the interference dampener analyzes the interference included in the electronic signal to monitor operation of the bubbler air compressor by detecting oscillating wave patterns.

7. The liquid level determination system according to claim 1 wherein a calibration of the electronic signal is performable by the level detection processor, the calibration being storable in the memory.

8. The liquid level determination system according to claim 1 wherein a plurality of rules relating to operation of the level detection processor are manipulable using an interface, the rules relating to the operation being storable in the memory.

9. The liquid level determination system according to claim 1 wherein at least part of the pressure determination components are accessible over a network.

10. The liquid level determination system according to claim 1 wherein a purge event is identifiable by the level detection processor, wherein the purge event is defined as removal of an obstruction from the pressure pipe through the bubbler pipe end.

11. A liquid level determination system comprising:
pressure determination components; and
a pressure pipe with a pressure sensing pipe end located adjacent to the pressure determination components and a bubbler pipe end locatable at least partially in a wet well;

wherein the pressure determination components comprise:
a transducer carried by the pressure pipe to the pressure pipe sensing end for determining a pressure level within the pressure pipe,
a level detection processor in communication with memory and the transducer to analyze the pressure level sensed by the transducer,
a bubbler air compressor operatively connected to the pressure pipe to provide air pressure to the pressure pipe, and
an interference dampener provided by a computer program product includable in the memory that is executable by the level detection processor to mitigate interference originating from the bubbler air compressor, wherein the program receives the pressure level sensed by the transducer as an electronic signal, classifies interference included in the electronic signal, and removes at least part of the interference from the electronic signal to produce a dampened transducer signal.

12. The liquid level determination system according to claim 11 wherein the interference dampener analyzes the interference included in the electronic signal to monitor operation of at least one of the pressure determination components.

13. The liquid level determination system according to claim 11 wherein the interference dampener analyzes the interference included in the electronic signal to monitor operation of the bubbler air compressor by detecting oscillating wave patterns.

14. The liquid level determination system according to claim 11 wherein a calibration of the electronic signal is performable by the level detection processor, the calibration being storable in the memory.

15. The liquid level determination system according to claim 11 wherein a plurality of rules relating to operation of the level detection processor are manipulable using an interface, the rules relating to the operation being storable in the memory.

16. The liquid level determination system according to claim 11 wherein at least part of the pressure determination components are accessible over a network.

17. The liquid level determination system according to claim 11 herein a purge event is identifiable by the level detection processor, wherein the purge event is defined as removal of an obstruction from the pressure pipe through the bubbler pipe end.

18. The liquid level determination system according to claim 11 further comprising a pump controller in communication with the level detection processor to control a pump locatable in the wet well; wherein the pump is controllable by the pump controller based on the dampened transducer signal.

19. A method for determining a liquid level using a liquid level determination system, the system comprising a pressure pipe with a pressure sensing pipe end located adjacent to pressure determination components and a bubbler pipe end locatable at least partially in a wet well, wherein the wet well is defined as a space in which liquid is collectable, the method comprising:
providing air pressure to the pressure pipe using an operatively connected bubbler air compressor, the pressure pipe being at least partially open at the bubbler pipe end;
determining a pressure level in the pressure pipe using a transducer locatable at the pressure sensing pipe end of the pressure pipe, the pressure level being transmittable as an electronic signal;
analyzing the pressure level using a level detection processor in communication with memory and the transducer to detect interference, the pressure level being transmittable from the transducer to the level detection processor; and
mitigating the interference detected in the electronic signal using an interference dampener to generate a dampened transducer signal;
wherein a signal is transmittable to a pump controller to control a pump locatable in the wet well responsive to the dampened transducer signal.

20. The method according to claim 19 wherein the interference dampener includes a sensor plug positionable on the transducer at a sensing end of the transducer, the sensor plug at least partially enclosing a sensor plug interior space located between a sensing component of the transducer and the sensor plug, the sensor plug including a transducer hole through which air is passable between the pressure pipe and the sensor plug interior space; the method further comprising configuring the transducer hole to affect a rate at which the air is passable between the pressure pipe and the sensor plug interior space.

21. The method according to claim 20 wherein the transducer hole has a diameter of between about three and seven microns.

22. The method according to claim 19 wherein the interference dampener is provided by a computer program product includable the memory that is executable by the level detection processor, the method further comprising:
receiving the pressure level sensed by the transducer as the electronic signal;
classifying interference included in the electronic signal; and
removing at least part of the interference from the electronic sign to produce a dampened transducer signal transmittable to the pump controller;
wherein the pump is controllable by the pump controller based on the dampened transducer signal.

23. The method according to claim 19 further comprising analyzing the interference included in the electronic signal using the interference dampener to monitor operation of at least one of the pressure determination components.

24. The method according to claim 19 wherein the interference originates from a bubbler air compressor; further comprising analyzing the interference with oscillating wave patterns included in the electronic signal using the interference dampener to monitor operation of a bubbler air compressor.

25. The method according to claim 19 wherein a calibration of the electronic signal is performable by the level detection processor, the calibration being storable in the memory.

26. The Method according to claim 19 wherein a plurality of rules relating to the operation of the level detection processor are manipulable using an interface, the rules relating to the operation being storable in the memory.

27. The method according to claim 19 wherein at least part of the pressure determination components are accessible over a network.

28. The method according to claim 19 further comprising identifying an occurrence of a purge event using the level detection processor, wherein the purge event is defined as removal of an obstruction from the pressure pipe through the bubbler pipe end.

* * * * *